United States Patent [19]

Chung et al.

[11] Patent Number: 4,734,240

[45] Date of Patent: Mar. 29, 1988

[54] MELT-EXTRUSION OF POLYMER WHICH IS CAPABLE OF FORMING AN ANISOTROPIC MELT PHASE TO FORM LARGE SHAPED ARTICLES EXHIBITING IMPROVED POLYMERIC ORIENTATION

[75] Inventors: Tai-Shung Chung; Sunil K. Garg, both of Summit; Daniel Palangio, Woodbridge, all of N.J.

[73] Assignee: Hoechst Celanese Corporation, Somerville, N.J.

[21] Appl. No.: 822,091

[22] Filed: Jan. 24, 1986

[51] Int. Cl.⁴ .............................................. B29C 47/88
[52] U.S. Cl. ........................ 264/211.13; 264/177.16; 264/177.19; 264/210.5; 264/211.21; 425/378 R; 425/461
[58] Field of Search ............. 264/176 R, 210.5, 210.8, 264/176 F, 177 R, 209.7, 176.1, 211.21, 211.12, 177.16, 177.19, 108, 211.13; 425/461, 378 R, 467, 466, 144, 379 R

[56] References Cited

U.S. PATENT DOCUMENTS

| | | | |
|---|---|---|---|
| 3,283,041 | 11/1966 | Sommerfeld | 264/211.21 |
| 3,635,624 | 1/1972 | Nakakoshi et al. | 425/133.1 |
| 3,843,290 | 10/1974 | Sender | 425/144 |
| 3,920,782 | 11/1975 | Cogswell | 264/209.7 |
| 4,053,270 | 10/1977 | Collier et al. | 425/379 S |
| 4,080,138 | 3/1978 | Hutchinson et al. | 425/467 |
| 4,216,253 | 8/1980 | Bonnebat et al. | 264/40.6 |
| 4,325,903 | 4/1982 | Wissbrun et al. | 264/176 F |
| 4,332,759 | 6/1982 | Ide | 264/108 |
| 4,468,364 | 8/1984 | Ide | 264/176 F |
| 4,529,565 | 7/1985 | Kasatani et al. | 264/176 R |
| 4,574,066 | 3/1986 | Gibbon et al. | 264/176 F |
| 4,581,399 | 4/1986 | Yoon | 264/176.1 |
| 4,581,443 | 4/1986 | Garg | 264/102 |

FOREIGN PATENT DOCUMENTS

| | | | |
|---|---|---|---|
| 50-39753 | 4/1975 | Japan | 264/176.1 |
| 58-53418 | 3/1983 | Japan | 264/176 R |
| 60-58829 | 4/1985 | Japan | 264/176 R |

Primary Examiner—Jeffery Thurlow
Attorney, Agent, or Firm—Burns, Deene, Swecker & Mathis

[57] ABSTRACT

An improved technique is provided to melt-extrude a liquid crystalline polymer to form large elongated solid shaped articles which exhibit significantly improved polymeric orientation. The molten polymer which is capable of forming an anisotropic melt phase is extruded through a converging die that is provided with at least one enclosed cooling zone at an interior location within the flowing molten polymer wherein a cooling fluid is circulated. This cools the molten polymer adjacent the cooling zone with the concomitant increase in its melt viscosity. Such increased melt viscosity at the interior of the stream of the molten polymer contributes to the uniformity of the polymeric orientation imparted within the converging die as well as during subsequent drawdown outside the extrusion orifice. Such improved polymeric orientation leads to the formation of an improved product (e.g., a three-dimensional rod) which exhibits an unusually high tensile modulus in the direction of its length. The present invention accordingly overcomes difficulties encountered in the prior art wherein melt-extruded shaped articles significantly larger than fibers heretofore often have exhibited substantial internal heterogeneity and a highly oriented skin and a core of a substantially lesser polymeric orientation.

16 Claims, 1 Drawing Figure

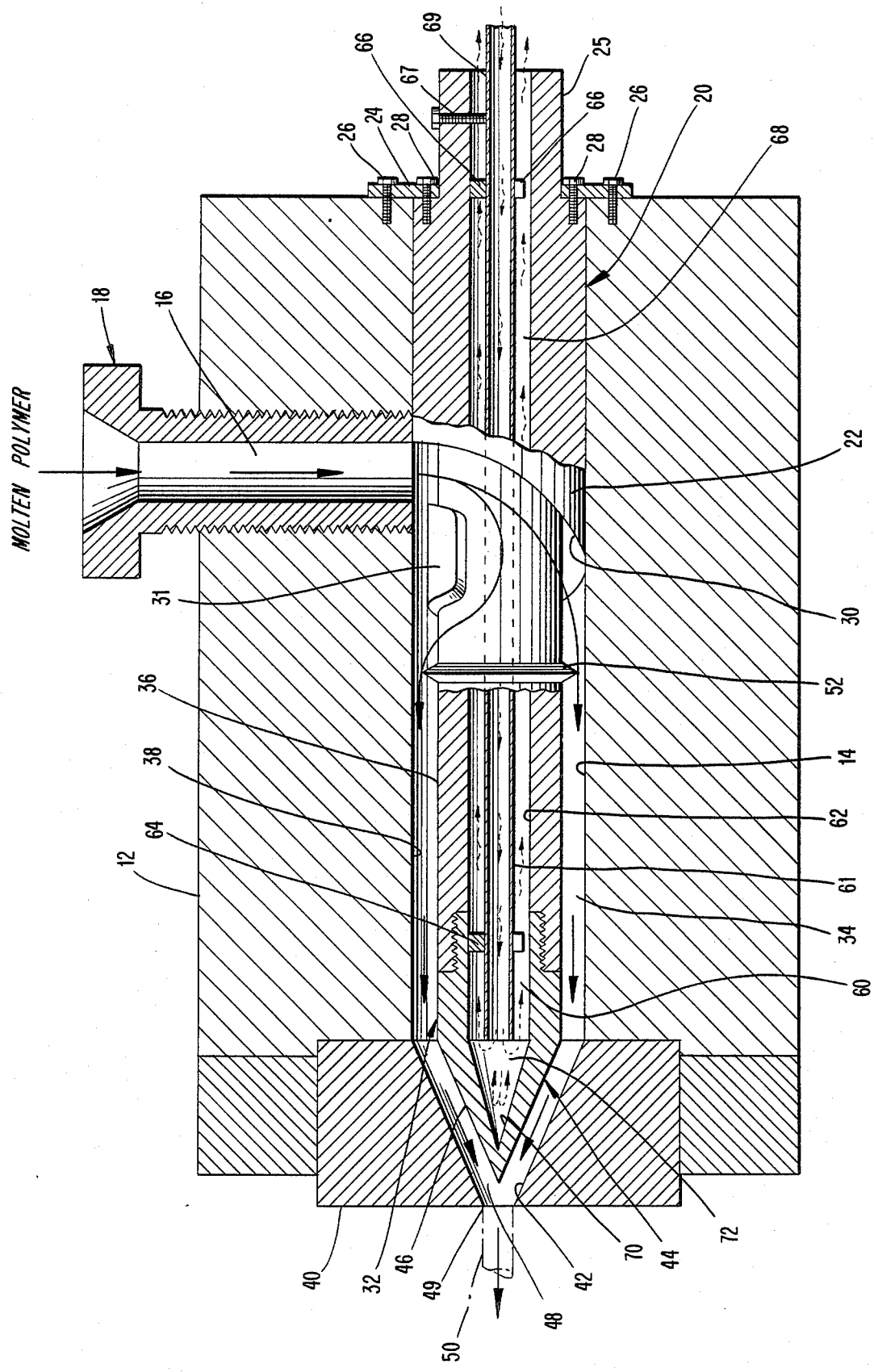

MELT-EXTRUSION OF POLYMER WHICH IS CAPABLE OF FORMING AN ANISOTROPIC MELT PHASE TO FORM LARGE SHAPED ARTICLES EXHIBITING IMPROVED POLYMERIC ORIENTATION

BACKGROUND OF THE INVENTION

It is known in the art that melt-processable polymers which exhibit an anisotropic (i.e., an ordered) melt phase can be melt-extruded through an extrusion die to form fibers, films, and three-dimensional shaped articles which substantially exhibit the same cross-sectional shape as that of the extrusion orifice. Such products of melt-extrusion commonly exhibit higher tensile modulus values than similar articles prepared from more common polymers which exhibit no anisotropy in the melt phase. Also, it has been found that polymers that exhibit no anisotropy in the melt phase usually cannot satisfactorily be melt-extruded to form elongated solid three-dimensional shaped articles which possess the desired cross-sectional configuration.

Representative prior disclosures which concern the formation of melt-extruded fibers from a polymer that is capable of forming an anisotropic melt phase are commonly assigned U.S. Pat. Nos. 4,083,829; 4,161,470; 4,219,461; 4,256,624; 4,330,457; and 4,473,682. A representative disclosure which concerns the formation of melt-extruded films from a polymer capable of forming an anisotropic melt phase is commonly assigned U.S. Pat. No. 4,332,759. Representative prior disclosures that concern the formation of melt-extruded three-dimensional shaped articles from a polymer which is capable of forming an anisotropic melt phase are commonly assigned U.S. Ser. No. 364,824, filed Apr. 2, 1982, and U.S. Pat. No. 4,468,364.

It has heretofore been observed in the prior art that, when large elongated articles (e.g., elongated rods) are melt-extruded from a polymer which is capable of forming an anisotropic melt phase, the resulting articles exhibit substantially lesser modulus values expressed in psi than do fibers that are melt-extruded from the same polymer. For instance, a melt-extruded filament of the anisotropic melt-forming wholly aromatic polyester of U.S. Pat. No. 4,161,470 of approximately 15 denier (i.e., a diameter of approximately 0.0015 inch) following heat treatment commonly will exhibit a tensile modulus of approximately 9,000,000 to 9,900,000 psi. A melt-extruded rod of the same polymer of U.S. Pat. No. 4,161,470 having a diameter of approximately 0.06 inch following heat treatment commonly will exhibit a tensile modulus of only approximately 3,500,000 to 4,000,000 psi. Also, a melt-extruded filament of the anisotropic melt-forming wholly aromatic poly(esteramide) of U.S. Pat. No. 4,330,457 of approximately 4.2 denier (i.e., a diameter of approximately 0.0008 inch) following heat treatment commonly will exhibit a tensile modulus of approximately 10,500,000 to 11,700,000 psi. A melt-extruded rod of the same polymer of U.S. Pat. No. 4,330,457 having a diameter of approximately 0.06 inch following heat treatment commonly will exhibit a tensile modulus of only approximately 6,000,000 to 7,000,000 psi. Such disparities in tensile modulus values are also apparent prior to heat treatment.

It is an object of the present invention to provide an improved process for the melt-extrusion of large solid elongated shaped articles from a polymer which exhibits an anisotropic melt phase.

It is an object of the present invention to provide an improved process for the melt-extrusion of large solid elongated shaped articles from a polymer which exhibits an anisotropic melt phase wherein non-isothermal conditions within the polymer prior to solidification are substantially minimized.

It is an object of the present invention to provide an improved process for the melt-extrusion of large solid elongated shaped articles from a polymer which exhibits an anisotropic melt phase wherein the resulting product exhibits an enhanced tensile modulus.

It is an object of the present invention to provide an improved process for the melt-extrusion of large solid elongated shaped articles from a polymer which exhibits an anisotropic melt phase wherein the resulting product exhibits an enhanced tensile modulus in the substantial absence of melt-fracture during the formation thereof.

It is another object of the present invention to provide an improved process for the melt-extrusion of large solid elongated shaped articles from a polymer which exhibits an anisotropic melt phase wherein more uniform polymeric orientation is accomplished throughout the cross-section of the resulting product.

It is a further object of the present invention to provide an improved extrusion die for the melt-extrusion of improved large elongated articles comprising a polymer which is capable of forming an anisotropic melt phase.

These and other objects, as well as the scope, nature, and utilization of the claimed invention will be apparent to those skilled in the art from the following detailed description and appended claims:

SUMMARY OF THE INVENTION

It has been found that a process of melt-extrusion for the formation of a solid elongated shaped article having a cross-sectional area of at least $7 \times 10^{-4}$ square inch, a minimum thickness of at least 30 mils, and a polymeric orientation substantially in the direction of its length which exhibits improved polymeric orientation uniformity throughout the interior thereof comprises:

(a) providing in a laterally confined zone a moving stream of molten polymer which exhibits an anisotropic melt phase, (b) passing the stream of molten polymer which exhibits an anisotropic melt phase through a converging die to produce an elongated extrudate while providing at the interior of the stream of molten polymer while present in the converging die at least one enclosed cooling zone wherein a cooling fluid is circulated whereby the portion of the molten polymer adjacent to the cooling zone is cooled and the melt viscosity thereof is increased while maintaining the polymer in the molten state, and (c) subjecting the resulting elongated extrudate outside the extrusion die to the cooling of its exterior and to a drawdown of approximately 1.51 to 10:1 while forming said solid elongated shaped article, whereby the increased melt viscosity at the interior of the stream of molten polymer created in step (b) contributes to the uniformity of the polymeric orientation which is imparted in steps (b) and (c).

An apparatus is provided for the melt-extrusion of molten polymer to form a solid elongated shaped article having a cross-sectional area of at least $7 \times 10^{-4}$ square inch, a minimum thickness of at least 30 mils, and a polmeric orientation substantially in the direction of its length which exhibits improved polymeric orientation uniformity throughout the interior thereof, the apparatus comprising:

(a) a forwardly converging die passage having a discharge opening at a forward end thereof, the die passage including forwardly convergent inner surface means extending toward the discharge opening, (b) means for supplying a stream of molten polymer to the die passage such that the melt stream flows forwardly therethrough with the interior of the melt stream flowing along the inner surface means, and (c) means for cooling the inner surface means such that the interior of the melt stream passing through the die passage is cooled and assumes a higher melt viscosity in response to being cooled, so that the uniformity of the polymeric orientation in the product is maximized.

DESCRIPTION OF THE DRAWING

The drawing is a longitudinal sectional view of one embodiment of the extrusion apparatus in accordance with the present invention.

DESCRIPTION OF PREFERRED EMBODIMENTS

As previously indicated, it has not heretofore been possible to melt-extrude elongated articles substantially larger in cross-section than fibers from a polymer which is capable of forming an anisotropic melt phase without experiencing a substantial reduction in the mechanical properties of the product, such as the tensile modulus properties For instance, in general, it has been observed that the tensile modulus decays somewhat linearly with the increasing cross-sectional size of the extruded product. Also, it has been observed that substantial heterogeneity with respect to polymer orientation is present at internal locations in such large extruded products of the prior art. The outer surface of the large articles which are melt-extruded from such polymers tends to incorporate well-oriented polymer chains while the polymer chains at the interior thereof tend to be somewhat disoriented.

In the extrusion processes for forming large elongated articles of the prior art, it is believed that, as the molten polymeric material exits from the extrusion orifice, the outer surface thereof first solidifies. While the polymer molecules of such surface are transformed from a molten liquid to a solid, they are subjected to a substantial stress which serves to orient such molecules. However, the core of the extrudate cools more slowly and remains molten for a longer period of time, and therefore does not fully carry its share of the stress which is imparted during drawdown outside the extrusion orifice. Also, there is an opportunity for the molecules present within the molten core of the extrudate to freely relax or recoil and to give up to at least some degree orientation which was previously imparted to the same. As hereafter described, the present invention makes possible a relatively high level of polymeric orientation within the resulting product which is substantially more uniform throughout the product.

The polymer from which the solid elongated shaped articles of the present invention are formed must be a thermotropic liquid crystalline polymer which is of the requisite molecular weight to be capable of undergoing melt-extrusion. Such thermotropic liquid crystalline polymers have been known in the art.

As is known in polymer technology, a thermotropic liquid crystalline polymer exhibits optical anisotropy in the melt. The anisotropic character of the polymer melt may be confirmed by conventional polarized light techniques whereby crossed-polarizers are utilized. More specifically, the anisotropic nature of the melt phase may conveniently be confirmed by the use of a Leitz polarizing microscope at a magnification of 40× with the sample on a Leitz hot stage and under a nitrogen atmosphere. The amount of light transmitted changes when the sample is forced to flow; however, the sample is optically anisotropic even in the static state. On the contrary, typical melt-processable polymers do not transmit light to any substantial degree when examined under identical conditions.

Representative classes of polymers from which the thermotropic liquid crystalline polymer suitable for use in the present invention may be selected include wholly aromatic polyesters, aromatic-aliphatic polyesters, wholly aromatic poly(ester-amides), aromatic-aliphatic poly(ester-amides), aromatic polyazomethines, aromatic polyester-carbonates, and mixtures of the same. In preferred embodiments the thermotropic liquid crystalline polymer is a wholly aromatic polyester, a wholly aromatic poly(ester-amide), or an aromatic-aliphatic poly(ester-amide). In such wholly aromatic polyester and wholly aromatic poly(ester-amide), each moiety present within the polymer chain contributes at least one aromatic ring. Also, it is preferred that naphthalene moieties be included in the thermotropic liquid crystalline polymer (e.g., 6-oxy-2-naphthoyl moiety, 2,6-dioxynaphthalene moiety, or 2,6-dicarboxynaphthalene moiety) in a concentration of not less than about 10 mole percent. The particularly preferred naphthalene moiety for inclusion in the thermotropic liquid crystalline polymer is the 6-oxy-2-naphthoyl moiety in a concentration of not less than about 10 mole percent.

Representative wholly aromatic polyesters which exhibit thermotropic liquid crystalline properties include those disclosed in the following U.S. patents which are herein incorporated by reference: U.S. Pat. Nos. 3,991,013; 3,991,014; 4,066,620; 4,067,852; 4,075,262; 4,083,829; 4,093,595; 4,118,372; 4,130,545; 4,146,702; 4,153,779; 4,156,070; 4,159,365; 4,161,470; 4,169,933; 4,181,792; 4,183,895; 4,184,996; 4,188,476; 4,201,856; 4,219,461; 4,224,433; 4,226,970; 4,230,817; 4,232,143; 4,232,144; 4,238,598; 4,238,599; 4,238,600; 4,242,496; 4,245,082; 4,245,084; 4,247,514; 4,256,624; 4,265,802; 4,267,304; 4,269,965; 4,279,803; 4,294,955; 4,299,756; 4,318,841; 4,337,190; 4,337,191; 4,355,134; and 4,473,682. As discussed hereafter, the wholly aromatic polyester of U.S. Pat. No. 4,161,470 is preferred for use in the present invention.

Representative aromatic-aliphatic polyesters which exhibit thermotropic liquid crystalline properties are copolymers of polyethylene terephthalate and hydroxybenzoic acid as disclosed in *Polyester X-7G-A Self-Reinforced Thermoplastic*, by W.J. Jackson, Jr., H.F. Kuhfuss, and T.F. Gray, Jr., 30th Anniversary Technical Conference, 1975 Reinforced Plastics/Composites Institute, The Society of the Plastics Industry, Inc., Section 17-D, Pages 1-4. A further disclosure of such copolymers can be found in "Liquid Crystal Polymers: I Preparation and Properties of p-Hydroxybenzoic Acid Copolymers," *Journal of Polymer Science, Polymer Chemistry Edition*, Vol. 14, pages 2043 to 2058 (1976), by W.J. Jackson, Jr., and H.F. Kuhfuss. See, also, commonly assigned U.S. Pat. Nos. 4,318,842 and 4,355,133, which are herein incorporated by reference.

Representative wholly aromatic and aromatic-aliphatic poly(ester-amides) which exhibit thermotropic liquid crystalline properties are disclosed in U.S. Pat. Nos. 4,272,625; 4,330,457; 4,339,375; 4,341,688; 4,351,917; 4,351,918; and 4,355,132, which are herein incorporated by reference. As discussed hereafter, the poly(ester-amide) of U.S. Pat. No. 4,330,457 is particularly preferred for use in the present invention. Such poly(ester-amide) has been found to possess an inherent propensity for its polymer chains to readily undergo orientation upon processing in accordance with the present invention.

Representative aromatic polyazomethines which exhibit thermotropic liquid crystalline properties are disclosed in U.S. Pat. Nos. 3,493,522; 3,493,524; 3,503,739; 3,516,970; 3,516,971; 3,526,611; 4,048,148; and 4,122,070. Each of these patents is herein incorporated by reference in its entirety. Specific examples of such polymers include poly(nitrilo-2-methyl-1,4-phenylenenitriloethylidyne-1,4-phenyleneethylidyne); poly(nitrolo-2-methyl-1,4-phenylenenitrilomethylidyne-1,4-phenylene-methylidyne); and poly(nitrilo-2-chloro-1,4-phenylenenitrilomethylidyne-1,4-phenylenemethylidyne).

Representative aromatic polyester-carbonates which exhibit thermotropic liquid crystalline properties are disclosed in U.S. Pat. Nos. 4,107,143; 4,284,757; and 4,371,660, which are incorporated by reference. Examples of such polymers include those consisting essentially of p-oxybenzoyl units, p-dioxyphenyl units, dioxycarbonyl units, and terephthoyl units.

A thermotropic liquid crystalline polymer commonly is selected for use in the formation of the large elongated shaped articles of the present invention which possesses a melting temperature within the range that is readily amenable to melt-extrusion. For instance, thermotropic liquid crystalline polymers commonly are selected which exhibit a melting temperature somewhere within the range of approximately 250° to 400° C.

The thermotropic liquid crystalline polymer selected preferably also exhibits an inherent viscosity of at least 2.0 dl./g. when dissolved in a concentration of 0.1 percent by weight in pentafluorophenal at 60° C. (e.g., an inherent viscosity of approximately 2.0 to 15.0 dl./g.).

A preferred wholly aromatic polyester for use in the present invention is that disclosed in U.S. Pat. No. 4,161,470 which is capable of forming an anisotropic melt phase at a temperature below approximately 350° C. This polyester consists essentially of the recurring moieties I and II wherein:

I is 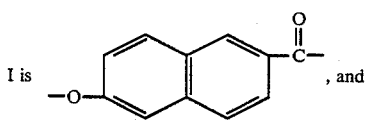 , and

II is 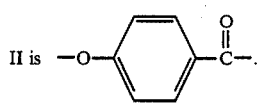.

The polyester comprises approximately 10 to 90 mole percent of moiety I, and approximately 10 to 90 mole percent of moiety II. In one embodiment, moiety II is present in a concentration of approximately 65 to 85 mole percent, and preferably in a concentration of approximately 70 to 80 mole percent. In a particularly preferred embodiment, the wholly aromatic polyester consists essentially of approximately 27 mole percent of recurring 6-oxy-2-naphthoyl moieties and approximately 73 mole percent of recurring 4-oxybenzoyl moieties. In another embodiment, moiety II is present in a lesser proportion of approximately 15 to 35 mole percent, and preferably in a concentration of approximately 20 to 30 mole percent. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, and mixtures thereof. Such polymer preferably has an inherent viscosity of approximately 3.5 to 10 dl./g. when dissolved in a concentration of 0.1 percent by weight in pentafluorophenol at 60° C.

The particularly preferred wholly aromatic poly(ester-amide) or aromatic-aliphatic poly(ester-amide) for use in the present invention is disclosed in commonly assigned U.S. Pat. No. 4,330,457, which is capable of forming an anisotropic melt phase at a temperature below approximately 400° C. The poly(ester-amide)s there disclosed consist essentially of recurring moieties I, II, III, and, optionally, IV wherein:

I is 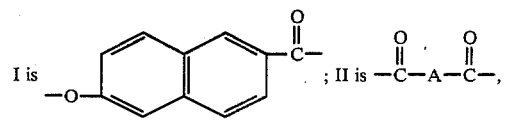

where A is a divalent radical comprising at least one aromatic ring or a divalent trans-1,4-cyclohexylene radical;

III is —Y—Ar—Z—, where Ar is a divalent radical comprising at least one aromatic ring, Y is O, NH, or NR, and Z is NH or NR, where R is an alkyl group of 1 to 6 carbon atoms or an aryl group; and IV is —O—Ar'—O—, where Ar' is a divalent radical comprising at least one aromatic ring;

wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, and mixtures thereof, and wherein said poly(ester-amide) comprises approximately 10 to 90 mole percent of moiety I, approximately 5 to 45 mole percent of moiety II, approximately 5 to 45 mole percent of moiety III, and approximately 0 to 40 mole percent of moiety IV. The preferred dicarboxy aryl moiety II is:

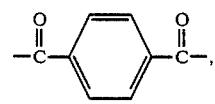

the preferred moiety III is:

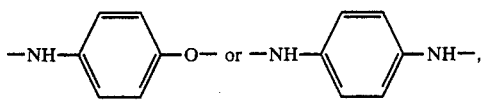

and the preferred dioxy aryl moiety IV is:

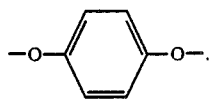

Such polymer preferably has an inherent viscosity of approximately 2.0 to 10 dl./g. when dissolved in a concentration of 0.1 percent by weight in pentafluorophenol at 60° C. Also, in a particularly preferred embodiment, the poly(ester-amide) is wholly aromatic and consists essentially of approximately 60 mole percent of recurring 6-oxy-2-naphthoyl moieties, approximately 20 mole percent of recurring terephthaloyl moieties, and approximately 20 mole percent of recurring 4-oxyaminophenylene moieties.

One or more solid fillers and/or reinforcing agents optionally may be incorporated in the polymer which is capable of forming an anisotropic melt phase prior to melt-extrusion. Such solid fillers and/or reinforcing agents should be of a size which will readily pass through the converging die (described hereafter) and which do not unduly interfere with the imposition of the desired polymeric orientation. Such fillers or reinforcing agents may be included in a concentration of approximately 1 to 30 percent by weight based upon the total weight of the composition. A representative solid filler is talc and a representative filler is glass fibers.

When carrying out the process of the present invention, a suitable extrusion apparatus is selected which is capable of developing the necessary pressure upon the molten polymeric material to accomplish substantially uniform melt-extrusion through the converging die (described hereafter). Representative extrusion machines which may be employed are of the single or multi-stage types and may possess single or twin screws. Such extruders are commercially available from Killion, Brabender, Modern Plastic Machinery Corp, etc.

The die which is utilized to form the solid elongated shaped articles in accordance with the present invention has a converging die passage and includes at its interior at least one enclosed cooling zone wherein a cooling fluid is continuously circulated during the course of the melt-extrusion. The die employed is forwardly converging and causes the movement of the molten polymer stream to accelerate as it passes through the converging dies. Such die may be either conical or trumpet-shaped. Representative convergence ratios from the rear to the front of the extrusion die commonly range from approximately 2:1 to 20:1, and preferably from 8:1 to 14:1, based upon the cross-sectional areas through which the molten polymer is free to pass. The cross-sectional configuration of the extrusion orifice (i.e., discharge opening) through which the molten polymer exits the extrusion die may be in any one of a variety of configurations provided the size of the orifice is sufficiently large to form an elongated shaped article having a cross-sectional area of at least $7 \times 10^{-4}$ square inch (preferably at least $3.5 \times 10^{-3}$ square inch) and a minimum thickness of at least 30 mils (preferably at least 45 mils) following drawdown outside the extrusion orifice. Such extrusion orifice in a preferred embodiment is circular in configuration, but may, if desired, possess a more complex configuration such as a star, triangle, hexagon, etc.

The enclosed cooling zone within the molten polymer passing through the converging die presents at least one cooling surface in contact with the stream of molten polymer. An appropriate cooling fluid provided at a temperature lower than that of the molten polymer continuously is circulated within the cooling zone. Such cooling fluid preferably is a gas, but alternatively may be a liquid or oil. In a particularly preferred embodiment, the cooling fluid is air which is supplied to the cooling zone at a temperature of approximately 10° to 30° C. Representative liquids which may serve as the cooling fluid include water, silicone oil, etc.

The molten polymer preferably is initially provided in a laterally confined zone at a temperature which exceeds its differential scanning calorimetry peak melting temperature and is conveyed at this temperature from the extrusion apparatus to the converging die. For instance, such molten polymer conveniently may be conveyed to the converging die while at approximately 5° to 30° C. above the differential scanning calorimetry peak melting temperature and while under a pressure of approximately 100 to 2,000 psi, and preferably while under a pressure of approximately 200 to 500 psi. The differential scanning calorimetry peak melting temperature for a given polymer may be determined by employing repeat scans at a 20° C. per minute heat-up rate and observing the peak of the DSC melt transition.

As the molten polymer passes adjacent the cooling zone inside the converging die, the portion of the polymer which contacts the surface through which the cooling fluid is circulated is cooled and the melt viscosity thereof is increased while maintaining all of the polymer in the molten state. This increased melt viscosity in a portion of the molten polymer has been found to contribute to the uniformity of the polymeric orientation which is imparted in the converging die as well as during drawdown outside the converging die (described hereafter). Care is taken to maintain all of the polymer within the converging die in the molten state and to avoid any significant melt fracture which is evident in the product if excessive cooling takes place. For instance, a portion of the molten polymer may solidify and cause fracture while passing through the converging die if the temperature of the internal tip of the die is as much as 10° C. below the DSC peak melting temperature of the polymer. The temperature of the internal tip of the die may be measured by a thermocoupler inserted into the tip body.

The resulting elongated extrudate outside the extrusion die is subjected to cooling by contacting its exterior with an appropriate cooling media (e.g., a liquid or gas). Preferably the extrudate is immersed in a circulating bath of water or other liquid which is maintained at an appropriate temperature to impart the cooling required for solidification of the product. While the resulting elongated extrudate is cooled, it is subjected to a drawdown of approximately 1.5:1 to 10:1, and preferably to a drawdown of approximately 3:1 to 5:1. The drawdown ratio is defined as the ratio of the cross-sectional area of the die discharge opening to that of the cross-sectional area of the fully solidified extrudate.

The mechanical properties of the elongated shaped articles formed in accordance with the present invention generally can be enhanced by subjecting the articles to heat treatment following extrusion. The articles may be thermally treated in a circulating inert atmosphere (e.g., nitrogen, argon, helium) or alternatively in a flowing oxygen-containing atmosphere (e.g., air). For instance, the article may be brought to a temperature of approximately 10° to 30° C. below the melting temperature of the polymer, at which temperature the article remains a solid object. The heat treatment times commonly range from a few minutes to a number of days (e.g., from 0.5 to 200 hours, or more). Preferably, the heat treatment is conducted for a time of 1 to 48 hours (e.g., approximately 24 to 30 hours). The heat treatment further improves the properties of the elongated articles by increasing the molecular weight thereof and increasing the crystallinity of the previously oriented molecules in the solid state.

The elongated melt-extruded articles formed by the process of the present invention are substantially larger in cross-section than fibers and have a cross-sectional area of at least $7 \times 10^{-4}$ square inch (preferably at least $3.5 \times 10^{-3}$ square inch), and a minimum thickness of at least 30 mils (preferably at least 70 mils). In a preferred embodiment, elongated circular rods are formed having a diameter of approximately 30 to 120 mils. In a particularly preferred embodiment, an elongated circular rod is formed having a diameter of approximately 70 to 75 mils. Such rods commonly may have a length of up to one mil or more and may be used as a stiffening support in an optical fiber cable.

The elongated melt-extruded articles of the present invention have been found to exhibit a substantially improved internal structure of higher modulus when compared with other large melted-extruded articles of the prior art. The polymer orientation substantially in the direction of the length is of improved uniformity. Some anisotropic melt-forming polymers are inherently capable of exhibiting a higher tensile modulus than others. However, regardless of the anisotropic melt-forming polymer which is utilized, the polymeric orientation made possible with the present invention leads to the formation of products which exhibit higher tensile modulus values for a given polymer. The resulting product is solid in the sense that it is free of hollow areas and any substantial void content such as commonly encountered in the prior art.

A preferred melt-extrusion apparatus for forming a solid elongated rod of circular cross-section according to the present invention is depicted in the drawing. The apparatus comprises a block 12 containing a circular cylindrical bore 14. Communicating with that bore is a lateral supply duct 16 formed by a fitting 18 which is threaded into the block 12. The supply duct 16 is adapted to receive molten polymer from an extrusion apparatus (not shown) while under pressure and to conduct the same to the bore 14.

Disposed within the bore 14 is a hollow mandrel 20. The mandrel 20 comprises a cylindrical supporting portion 22 which fits slidingly within the bore 14 to accurately center the mandrel radially within the bore. Projecting rearwardly from the supporting portion 22 is a stub 25 of reduced diameter. A securing plate 24, including a central aperture, can be slid onto the stub and then secured by fasteners, such as screws 28, to the supporting portion 22. The plate 24 can also be attached to the block 12 by fasteners such as screws 26 after the mandrel has been inserted into the bore 14. By thus installing the mandrel 20 and end plate 24, the mandrel will radially be centered within the bore 14, and a curved guide surface 30 located at the front of the supporting portion will be aligned with the supply duct 16. As that guide surface 30 proceeds away from the duct 16, it curves progressively toward the front end of the mandrel. Accordingly, molten polymer exiting the supply duct 16 is directed generally forwardly by the guide surface 30. Guidance of the melt flow is assisted by a curved distribution plate 31 which extends forwardly and helically from the supporting portion 22 and constitutes a helical extension of the guide surface 30.

A forward portion 32 of the mandrel projects forwardly from the support portion 22 and is of smaller outer diameter than the bore 14. Accordingly, a feed channel 34 is formed between an oute surface 36 of the forward portion 32 and an inner surface 38 of the bore 14, the channel 34 having a ring-shaped cross-sectional configuration. The feed channel 34 defines a laterally confined zone adapted to conduct a flow of polymer melt in the longitudinal direction.

Attached at a front end of the block 12 is a die member 40 which contains a cylindrical hole formed by a forwardly converging surfac 42. The die member 40 is arranged such that the large-diameter end of the surface 42 aligns with the forward end of the bore 14, the diameter of the latter equaling the large diameter of the surface 42. The small diameter end of the surface 42 defines a discharge opening 49 sized in accordance with the diameter of a rod to be produced prior to drawdown outside the extrusion die.

The forward portion 32 of the mandrel includes a threadedly connected, generally pointed front tip 44, an outer conical surface 46 of which is forwardly convergent and spaced from the surface 42 of the hole to form therewith forwardly convergent die passage 48. Molten polymer which is directed forwardly by the guide surface 30 passes along the channel 34 and through the die passage 48 and then outwardly through the discharge opening 49 of the die. The resulting elongated extrudate 50 outside the die is subjected to a cooling or quenching of its exterior and to a drawdown e.g., of approximately 4:1 by appropriate takeup means (not shown) while forming a solid elongated rod.

The block 12 and die member 40 can be heated in order to maintain the polymer in the molten state. A radial projecting bumper 52 can be provided on the forward portion 32 to help direct the molten polymer flow.

In accordance with the present invention, the mandrel includes a central chamber 60 which is open at the rear end of the mandrel and closed at the front end. Mounted within the chamber 60 is a hollow tube 61 which extends parallel and coaxially relative to a longitudinal axis of the chamber and is spaced radially inwardly from a surface 62 of the chamber. The tube is held radially centered by front and rear sets of spacer members 64, 66. Each set comprises three spacer members which are spaced circumferentially apart by 120 degrees. Each spacer member extends between the surface 62 of the chamber 60 and an outer wall 69 of the tube to radially center the latter whereby a passage 68 of ring-shaped cross-section is formed therebetween. The tube 61 is secured against longitudinal movement by a radial set screw 67 mounted in the stub 25.

The rear end of the tube 61 is arranged to communicate with a source of pressurized cooling fluid, such as air, and the front end of the tube 61 is open. Hence, pressurized cooling air which is fed forwardly through the tube 61 returns rearwardly along the passage 68. As the cooling air exits the front end of the tube 61, it impinges against the surface 70 of a conical cavity 72 formed at the front end of the chamber 62. That cavity 72 defines as enclosed cooling zone (i.e., enclosed by the surface 70) which cools the surface 46 of the pointed tip 44 of the mandrel and thus cools the interior of the molten polymer as the latter travels through the passage 48 of the converging die. As a result, the melt viscosity of the interior of the melt is increased while the polymer is maintained in the molten state. That increased melt viscosity at the interior of the stream of molten polymer contributes to the uniformity of the polymeric orientation which is imparted within the converging die and during subsequent drawdown.

It will be appreciated that most of the cooling action occurs along the wall 70. That is, contact between the cooling fluid and the wall 70 results in a substantial transfer of heat, whereby the temperature of the cooling fluid tends to be raised to a level rendering it unsuited to performing further appreciable cooling action as it travels rearwardly through the passage 68. The air exiting the passage 68 can be exhausted to the immediate surroundings.

The dimensions of the extrusion apparatus are not critical, but in one embodiment it has been proposed that the supply duct 16 be 0.5 inch in diameter; the bore 14 be 0.685 inch in diameter; the outer diameter of the forward portion 32 of the mandrel be 0.5 inch in diameter; the chamber 62 be 0.25 inch in diameter; the inner diameter of the tube 61 be 0.1 inch; the longitudinal dimension of the pointed tip 44 (i.e., the dimension in a direction parallel to the longitudinal axis of the mandrel) be 0.5 inch; the diameter of the die exit opening 49 be 0.130 inch; and the longitudinal distance from the tip 35 of the mandrel to the opening 40 be 0.125 inch.

The following examples are presented as specific illustrations of the claimed invention. It should be understood, however, that the invention is not limited to the specific details set forth in the examples. Reference is made in the examples to the drawing.

EXAMPLE I

A wholly aromatic polyester which is capable of exhibiting an anisotropic melt phase was selected to form improved 75 mil rods in accordance with the concept of the present invention. This wholly aromatic polyester was formed in accordance with the teachings of commonly assigned U.S. Pat. No. 4,161,470, and consisted essentially of 27 mole percent of recurring 6-oxy-2-naphthoyl moieties, and 73 mole percent of recurring 4-oxybenzoyl moieties. The inherent viscosity of the polymer was 6.0 dl./gram as determined from a 0.1 percent by weight solution of the polymer in pentafluorophenol. The differential scanning calorimetry peak melting temperature of the polymer was approximately 278° C.

The polymer was provided at a temperature of approximately 290° C. in a one inch extruder, Model No. 1100 which was manufactured by Modern Plastic Machinery Corp., and was fed to the apparatus illustrated in drawing having the dimensions previously stated at a rate of 7 lb./hr. while under a pressure of 300 psi. The molten polymer passed through delivery duct 16, and entered bore 38 after being forwardly directed by guide surface 30. The molten polymer while at a temperature of approximately 290° C. forwardly was passed along channel 34. It then converged along the surface 46 toward the discharge opening of the die. The convergence ratio of the die was 14. Cooling air while at a temperature of approximately 20° C. and at a flow rate of 12 cubic feet/hour entered cavity 72 of the mandrel to cool the surface 46 to a temperature of approximately 270° C. Accordingly, the interior portion of the stream of molten polymer traveling through the converging die was correspondingly cooled to a temperature of approximately 280° C. and its melt viscosity was increased. As the melt 50 exited the die opening 49 it was quenched in a water bath provided at a temperature of 20° C. and solidified to form a solid circular rod of 75 mils diameter. After exiting from the die opening 49 the extrudate was subjected to a drawdown of 4:1 by means of a force exerted thereon by a take-up unit. The increased melt viscosity imparted to the interior of the stream of molten polymer as it contacted surface 46 contributed to the uniformity of the polymeric orientation which took place in the converging die and during the drawdown of the extrudate outside the die.

When the resulting 75 mil rod was tested in accordance with the procedure of ASTM D3822 it was found to exhibit an average tensile modulus of 5,700,000 psi. Following heat treatment in circulating nitrogen at 230° C. for 2 hours and at 270° C. for 16 hours the rod was found to exhibit an average tensile modulus of 8,000,000 psi.

When cooling air was supplied at a flow rate of 6 cubic feet/hour, the surface 46 was cooled to a temperature of only approximately 280° C. Accordingly, the interior portion of the stream of molten polymer traveling through the converging die was correspondingly cooled to only a temperature of approximately 285° C. The melt viscosity of the molten polymer stream nevertheless was increased at its interior and the results were beneficial, however, the improvement was less than previously reported when greater cooling was achieved. The resulting 75 mil rod was found to exhibit an average tensile modulus of 5,100,000 psi. Following heat treatment the rod was found to exhibit an average tensile modulus of 7,000,000 psi.

When the cooling air was supplied at a substantially increased flow rate of 18 cubic feet/hour, the surface 46 was cooled to a temperature of approximately 260° C. Accordingly, the interior portion of the stream of molten polymer traveling through the converging die was correspondingly cooled to a temperature of approximately 270° C. The melt viscosity of the molten polymer stream was substantially increased at its interior, however, the results were less beneficial than when the air flow rate was 12 cubic feet/hour. The resulting 75 mil rod was found to exhibit an average tensile modulus of 5,500,000 psi.

For comparative purposes a 75 mil rod was formed in the absence of air flow with the surface 46 being provided at the same temperature as the molten polymer. The resulting rod was found to exhibit an average tensile modulus of only 3,800,000 psi. Following heat treatment the rod was found to exhibit a tensile modulus of only 4,200,000 psi.

From the above data it is seen that the process of the present invention forms an improved product of higher modulus.

EXAMPLE II

A wholly aromatic poly(ester-amide) which is capable of exhibiting an anisotropic melt phase was selected to form improved 75 mil rods in accordance with the concept of the present invention. This wholly aromatic poly(ester-amide) was formed in accordance with the teachings of commonly assigned U.S. Pat. No. 4,330,457, and consisted of 60 mole percent of recurring 6-oxy-2-naphthoyl moieties, 20 mole percent of recurring terephthaloyl moieties, and 20 mole percent of recurring 4-oxyaminophenylene moieties. The inherent viscosity of the polymer was 5.8 dl./gram as determined from a 0.1 percent by weight solution of the polymer in pentafluorophenol. The differential scanning calorimetry peak melting temperature of the polymer was approximately 273° C.

The poly(ester-amide) was melt-extruded as previously described in connection with Example I. It was found that the polymer molecules of the poly(ester-amide) of Example II inherently orient more readily than the molecules of the wholly aromatic polyester of Example I. Nevertheless, the processing conditions of the present invention consistently made possible a more uniform polymeric orientation throughout the resulting rod in each instance.

When cooling air was supplied at a rate of 12 cubic feet/hour the resulting 75 mil rod was found to exhibit an average tensile modulus of 9,800,000 psi.

When cooling air was supplied at a rate of 6 cubic feet/hour the resulting 75 mil rod was found to exhibit an average tensile modulus of 9,300,000 psi.

When cooling air was supplied at a rate of 18 cubic feet/hour the resulting 75 mil rod was found to exhibit an average tensile modulus of 9,600,000 psi.

Also, for comparative purposes a 75 mil rod was formed in the absence of air flow. The resulting rod was found to exhibit an average tensile modulus of only 8,600,000 psi.

From the above data it is seen that the process of the present invention forms an improved product of higher modulus.

Although the invention has been described with preferred embodiments, it is to be understood that variations and modifications may be employed as will be apparent to those skilled in the art. Such variations and modifications are to be considered within the purview and the scope of the claims appended hereto.

We claim:

1. A process of melt-extrusion for the formation of a solid elongated shaped article having a cross-sectional area of at least $7 \times 10^{-4}$ square inch, a minimum thickness of at least 30 mils, and a polymeric orientation substantially in the direction of its length which exhibits improved polymeric orientation uniformity throughout the interior thereof comprising:
   (a) providing in a laterally confined zone a moving stream of molten polymer which exhibits an anisotropic melt phase,
   (b) passing said stream of molten polymer which exhibits an anisotropic melt phase through a converging die to produce an elongated extrudate while providing at the interior of said stream of molten polymer while present in said converging die at least one enclosed cooling zone wherein a cooling fluid is circulated whereby the portion of the molten polymer adjacent to said cooling zone is cooled and the melt viscosity thereof is increased while maintaining said polymer in the molten state, and
   (c) subjecting the resulting elongated extrudate outside the extrusion die to the cooling of its exterior and to a drawdown of approximately 1.5:1 to 10:1 while forming said solid elongated shaped article, whereby the increased melt viscosity at the interior of said stream of molten polymer created in step (b) contributes to the uniformity of the polymeric orientation which is imparted in steps (b) and (c).

2. A process of melt-extrusion for the formation of a solid elongated shaped article according to claim 1 wherein said polymer which exhibits an anisotropic melt phase is selected from the group consisting of wholly aromatic polyesters, aromatic-aliphatic polyesters, wholly aromatic poly(ester-amides), aromatic-aliphatic poly(ester-amides), aromatic polyazomethines, aromatic polyester carbonates, and mixtures of the foregoing.

3. A process of melt-extrusion for the formation of solid elongated shaped article according to claim 1 wherein said polymer which exhibits an anisotropic melt phase is wholly aromatic in the sense that each moiety present contributes a least one aromatic ring.

4. A process of melt-extrusion for the formation of a solid elongated shaped article according to claim 1 wherein said polymer which exhibits an anisotropic melt phase is a wholly aromatic polyester.

5. A process of melt-extrusion for the formation of a solid elongated shaped article according to claim 1 wherein said polymer which exhibits an anisotropic melt phase is a wholly aromatic poly(ester-amide).

6. A process a melt-extrusion for the formation of a solid elongated shaped article according to claim 1 wherein said polymer which exhibits an anisotropic melt phase, is a polymer which includes not less than about 10 mole percent of recurring units which include a naphthalene moiety.

7. A process of melt-extrusion for the formation of a solid elongated shaped article according to claim 1 wherein said polymer which exhibits an anisotropic melt phase includes not less than about 10 mole percent of recurring units which include a naphthalene moiety selected from the group consisting of 6-oxy2-naphthoyl moiety, 2,6-dioxynaphthalene moiety, and 2,6-dicarboxynaphthalene moiety.

8. A process of melt-extrusion for the formation of a solid elongated shaped article according to claim 1 wherein said polymer which exhibits an anisotropic melt phase is a wholly aromatic polyester and consists essentially of moieties I and II which may include substitution of at least some of the hydrogen atoms present upon an aromatic ring wherein:

I is 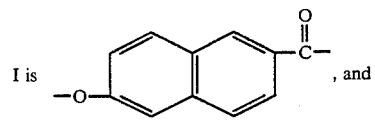 , and

II is 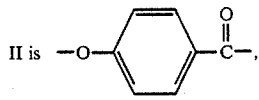

with said optional substitution if present being selected from the group consisting of an alkyl group to 1 to 4 carbon atoms, an alkoxy group of 1 to 4 carbon atoms, halogen, phenyl, and mixtures thereof, and wherein said wholly aromatic polyester comprises approximately 10 to 90 mole percent of moiety I and approximately 10 to 90 mole percent of moiety II.

9. A process of melt-extrusion for the formation of a solid elongated shaped article according to claim 1 wherein said polymer which exhibits an anisotropic melt phase is a wholly aromatic polyester which consists essentially of approximately 27 mole percent of recurring 6-oxy-2-naphthoyl moieties and approximately 73 mole percent of recurring 4-oxybenzoyl moieties.

10. A process of melt-extrusion for the formation of a solid elongated shaped article according to claim 1 wherein said polymer which exhibits an anisotropic melt phase is a poly(ester-amide) and consists essentially of moieties I, II, III, and optionally IV, wherein:

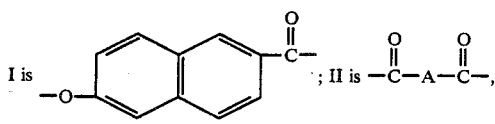

where A is a divalent radical comprising at least one aromatic ring or a divalent trans-1,4-cyclohexylene radical;

III is —Y—Ar—Z— where Ar is a divalent radical comprising at least one aromatic ring, Y is O, NH or NR, and Z is NH or NR, where R is an alkyl group of 1 to 6 carbon atoms; and IV is —O—Ar'—O— where Ar' is a divalent radical comprising at least one aromatic ring;

wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, and mixtures thereof, and wherein said poly(ester-amide) comprises approximately 10 to 90 mole percent of moiety I, approximately 5 to 45 mole percent of moiety II, approximately 5 to 45 mole percent of moiety III, and approximately 0 to 40 mole percent of moiety IV.

11. A process of melt-extrusion for the formation of a solid elongated shaped article according to claim 1 wherein said polymer which exhibits an anisotropic melt phase is a poly-(ester-amide) which consists essentially of approximately 60 mole percent of recurring 6-oxy-2-naphthoyl moieties, approximately 20 mole percent of recurring terephthaloyl moieties, and approximately 20 mole percent of recurring 4-oxyaminophenylene moieties.

12. A process of melt-extrusion for the formation of a solid elongated shaped article according to claim 1 wherein said converging die utilized in step (b) has a convergence ratio of approximately 2:1 to 20:1.

13. A process of melt-extrusion for the formation of a solid elongated shaped article according to claim 12 wherein said converging die is conical in configuration.

14. A process of melt-extrusion for the formation of a solid elongated shaped article according to claim 1 wherein said extrudate in step (c) is subjected to a draw-down of approximately 3:1 to 5:1.

15. A process of melt-extrusion for the formation of a solid elongated shaped article according to claim 1 wherein said solid elongated extrudate has a circular cross-section of approximately 30 to 120 mils.

16. A process of melt-extrusion for the formation of a solid elongated shaped article according to claim 1 wherein said solid elongated extrudate has a circular cross-section of approximately 70 to 75 mils.

* * * * *